US006172549B1

(12) United States Patent
Gilbert

(10) Patent No.: US 6,172,549 B1
(45) Date of Patent: Jan. 9, 2001

(54) LOW SUPPLY CURRENT RMS-TO-DC CONVERTER

(75) Inventor: Barrie Gilbert, Portland, OR (US)

(73) Assignee: Analog Devices, Inc., Norwood, MA (US)

(*) Notice: Under 35 U.S.C. 154(b), the term of this patent shall be extended for 0 days.

(21) Appl. No.: 09/256,640

(22) Filed: Feb. 24, 1999

(51) Int. Cl.[7] ............................ G06F 7/556; G06G 7/20; G06G 7/24

(52) U.S. Cl. ............................ 327/349; 327/361

(58) Field of Search ............................ 327/346, 347, 327/348, 349, 361; 323/315

(56) References Cited

U.S. PATENT DOCUMENTS 4,250,457 * 2/1981 Hofmann ............................ 329/349
5,909,136 * 6/1999 Kimura ............................ 327/356

OTHER PUBLICATIONS

Gilbert, Barrie; Novel Technique for R.M.S.—D.C. Conversion Based on the Difference of Squares; *Electronics Letters*; vol. 11, No. 8; Apr. 17, 1975; pp. 181–182.

Gilbert, Barrie; Current–mode Circuits From A Translinear Viewpoint: A Tutorial; *Analogue IC design: the current mode approach*; 1990; pp. 33–53.

* cited by examiner

*Primary Examiner*—Terry D. Cunningham
*Assistant Examiner*—Quan Tra
(74) *Attorney, Agent, or Firm*—Marger Johnson & McCollom, P.C.

(57) ABSTRACT

An RMS-to-DC converter implements the difference of squares function using two squaring cells operating in opposition to attain a balance. Each of the squaring cells is implemented as a grounded-base transistor and a two-transistor current mirror. The emitter of the grounded-base transistor is coupled to the input terminal of the current mirror at a node which receives the input signal. The collector of the grounded-base transistor and the output of current mirror are coupled together to generate an output current having a square-law relationship to the input signal. One of the squaring cells receives the input signal and operates at high frequencies (HF), while the other receives a feedback signal and operates in a quasi-DC mode. In a measurement node, a nulling circuit closes a feedback loop around the DC squaring cell to null the output currents from the squaring cells. The nulling circuit includes a filter capacitor for low-pass filtering the output signal from the HF squaring cell, an error amplifier, which is essentially an integrator, for sensing the difference between the currents from the squaring cells, and a circuit for converting the output voltage from the error amplifier to a feedback current for driving the DC squaring cell. The error amplifier includes a resistive load for converting the currents to voltages and a specialized op-amp having high DC precision for sensing the voltage difference. The squaring cell bias current adjusts the input impedance of the cell. The squaring cell may be matched to an external signal source. The dynamic range can be extended by using a non-linear load in the error amplifier and emitter resistors in the squaring cells. The output signal is obtained by replicating the feedback current in a separate path. The two squaring cells are inherently balanced by design and by careful attention to device matching, including cross-quadding of parallel cells, and by using a single bias voltage.

46 Claims, 11 Drawing Sheets

LOW SUPPLY CURRENT RMS-TO-DC CONVERTER

This application is related to co-pending U.S. patent application Ser. No. 09/245,051 titled "RMS-To-DC Converter With Balanced Multi-Tanh Triplet Squaring Cells" filed Feb. 4, 1999 which is incorporated herein by reference.

BACKGROUND OF THE INVENTION

The present invention relates generally to RMS-to-DC converters, and more particularly, to RMS-to-DC converters that are capable of measuring true power at high frequencies and low supply currents.

SUMMARY OF THE INVENTION

The present invention utilizes two balanced squaring cells operating in opposition to implement the difference of squares function, thereby achieving true RMS-to-DC conversion. By implementing the squaring cells as simple three transistor cells, each having a grounded base transistor and a two-transistor current mirror, an RMS-to-DC converter in accordance with the present invention can operate at microwave frequencies while dissipating as little as 1 mW of quiescent power in these cells.

One of the squaring cells receives the high frequency (HF) input signal and generates a first current which represents the square of the HF input signal. The other squaring cell generates a second current that represents the square of a DC feedback current which is input to the cell.

Used as a measurement device, a nulling circuit closes a feedback loop around the DC squaring cell so as to balance the output currents from the squaring cells. This path includes a filter capacitor for low-pass filtering the output signal from the HF squaring cell, an error amplifier for sensing the difference between the output currents from the squaring cells, and a circuit for converting the output from the error amplifier to a feedback current for driving the DC squaring cell. The error amplifier includes a balanced resistive load for converting the currents from the squaring cells to voltages, and an op-amp for sensing the resulting voltage difference. In a preferred embodiment, a nonlinear load is used to extend the dynamic range of the squaring cells.

Each of the squaring cells includes a grounded base transistor and a current mirror. The grounded base transistor has its base anchored at a suitable bias voltage. The emitter of the grounded base transistor and the input terminal of the current mirror are connected together at the input terminal of the squaring cell. The collector of the grounded base transistor and the output of the current mirror are connected together at the output terminal of the squaring cell to generate the output current which approximates the square of the input signal.

The squaring cell provides a good square-law approximation over an input signal range that is largely determined by the thermal voltage $V_T$=kT/q. The input node of a squaring cell according to the present invention appears as a broad-band matching network to an external signal source, thereby terminating the generator without the need for an external termination resistor. The bias current through the squaring cells determines this input impedance. The two squaring cells are balanced by careful device matching and layout techniques. In a preferred embodiment, the HF cell is implemented as two parallel-connected cells which are physically located on opposite sides of the DC squaring cell to cancel effects from doping and thermal gradients. Using a single bias voltage for all of the cells further insures a high degree of balance between the two cells.

The output signal is obtained by replicating the current flowing into the input cell through a feedback interface; this current is unidirectional, that is, its sign is independent of the sign of the input current presented to the first squaring cell. The replicated current is converted to a voltage and buffered to provide substantial load driving capability even though quiescent current consumption is low.

DETAILED DESCRIPTION

Figure 1:
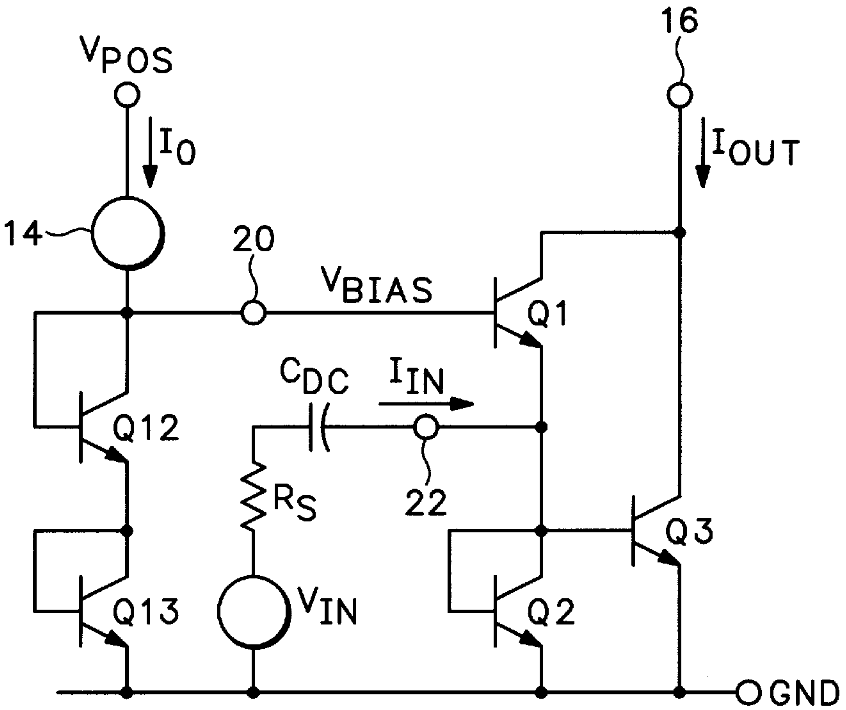
FIG. 1 is a schematic diagram of a first embodiment of a squaring cell in accordance with the present invention.

FIG. 1 is a schematic diagram of an embodiment of a squaring cell in accordance with the present invention. Squaring cell includes a transistor Q1 configured in a grounded base arrangement with its base connected to receive a bias voltage $V_{BIAS}$. The circuit of FIG. 1 is shown in a BJT embodiment, but could also be realized in a field-effect transistor (FET) embodiment (e.g., CMOS). In the context of Q1, grounded base refers to any type of transistor or other current control device having its control terminal (i.e., the base of a BJT or the gate of an FET) connected to an AC ground. The emitter of Q1 is connected to the base and collector of NPN transistor Q2, which forms a current mirror with transistor Q3. The collectors of diode-connected transistor Q1 and mirror transistor Q3 are connected together at the output terminal 16 of the cell for providing the output current $I_{OUT}$. The input signal is generated by a voltage source $V_{IN}$ having a source resistance $R_S$. The input current $I_{IN}$ is input to the input terminal 22 which is connected to the emitter of Q1 and the base-collector terminals of Q2. The emitters of Q2 and Q3 are connected to a power supply ground terminal GND. A blocking capacitor $C_{DC}$ eliminates DC input currents which would be caused by the input terminal 22 being at a $V_{BE}$ above GND.

The squaring cell of FIG. 1 is biased by an adjunct cell which includes two series-connected transistors Q12 and Q13 that are diode-connected in series between the bias node 20 and GND. The base of Q1 is also connected to the bias node 20. A current source 14 applies a bias current $I_0$ to the collector of Q12 to set up the bias voltage $V_{BIAS}$. The resulting quiescent (zero-signal) current in Q1–Q3 is proportional to absolute temperature (PTAT).

It can be shown that the output current $I_{OUT}$ from the squaring cell of FIG. 1 has the following form:

$$I_{OUT}=I_0\sqrt{x^2+4} \quad \text{(Eq. 1)}$$

where $x=I_{IN}/I_0$, and assuming all transistors have the same emitter areas.

Figure 2:
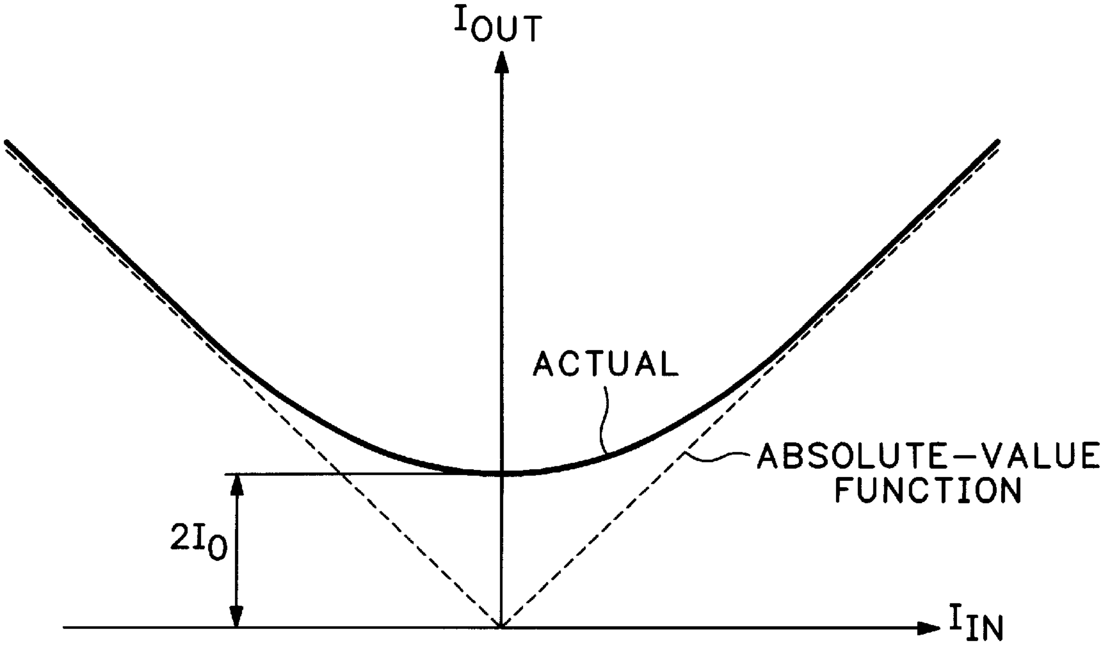
FIG. 2 is a graph showing the output function of the circuit of FIG. 1.

FIG. 2 is a graph showing the function of Eq. 1 as a solid line, from which it is apparent that, for small values of x, the function of Eq. 1 takes on a curvature reaching a minimum value of $2I_0$ at x=0 which will be referred to as the quiescent or zero-signal baseline current. The zero signal baseline current can be removed from Eq. 1 to yield:

$$I_{SQR}=I_{OUT}-2I_0=I_0\sqrt{x^2+4}-2I_0. \quad \text{(Eq. 2)}$$

By rearranging this equation and using the approximation:

$$\sqrt{1+\alpha}\approx 1+\alpha/2, \quad \text{(Eq. 3)}$$

it can be shown that $$I_{SQR}\approx x^2/4I_0 \quad \text{(Eq. 4)}$$

when the magnitude of x is small (<<4). Thus, for input currents that are small compared to $I_0$, the circuit of FIG. 1 can closely approximate a squaring function.

For values of x>>4, Eq. 1 can be approximated by:

$$I_{OUT}\approx I_0\sqrt{x^2}=I_0|x| \quad \text{(Eq. 5)}$$

which is the absolute-value function. Thus, for relatively large values of input current $I_{IN}$, the output current is approximately equal to the absolute-value of the input current. The function of Eq. 5 is shown in FIG. 2 as a broken line for comparison to the function of Eq. 1.

Therefore, if the input signal $I_{IN}$ applied to the squaring cell of FIG. 1 is limited to less than about $\pm 4I_0$, the squaring cell provides a good square-law approximation. That is, the optimum function of the squaring cell is limited to the curved portion of the solid curve shown in FIG. 2 which approximates a parabola.

Figure 3:
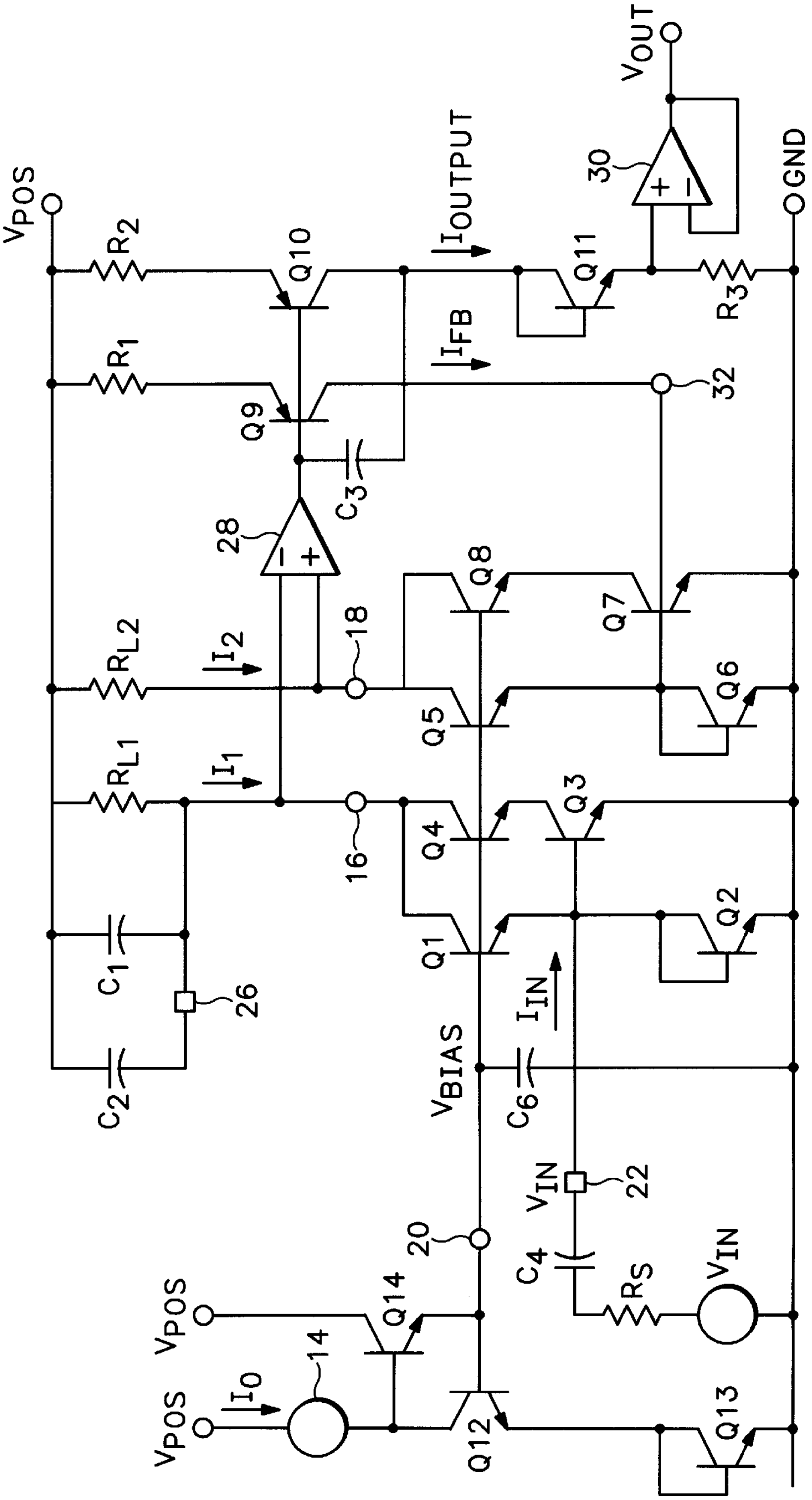
FIG. 3 is a schematic diagram of an embodiment of an RMS-to-DC converter in accordance with the present invention.

FIG. 3 is a simplified schematic diagram of an embodiment of an RMS-to-DC converter in accordance with the present invention which uses the squaring cell of FIG. 1 to implement the difference of squares function. The circuit of FIG. 3 is intended for fabrication in monolithic form on an integrated circuit.

The circuit of FIG. 3 includes a first squaring cell which will be referred to as a high frequency or "HF" squaring cell. The HF squaring cell is formed from NPN transistors Q1–Q3 which are arranged in the same manner as the squaring cell of FIG. 1, but with the addition of a further NPN transistor Q4 which has its collector connected to the collector of Q1 at node 16, its emitter connected to the collector of Q3, and its base connected to the base of Q1. Transistor Q4 acts as a cascode to Q3 and serves to improve the overall accuracy by equalizing the collector-base voltage of Q3 to that of Q2. In the context of Q4, cascode refers to a transistor having its control terminal (i.e., the base of a BJT or the gate of a FET) connected to an AC ground for the purpose of improving the accuracy of the circuit and/or counteracting the effects of the collector-junction capacitance ($C_{JC}$) of another bipolar transistor such as Q3 (or the drain-gate capacitance of a field-effect transistor).

The circuit of FIG. 3 includes a second, identical squaring cell which will be referred to as a "DC" squaring cell. The DC squaring cell includes NPN transistors Q5–Q8 which are configured in the same arrangement as Q1–Q4. The collectors of Q5 and Q8 are connected together at node 18. The bases of Q1, Q4, Q5 and Q8 are commonly connected at node 20 to receive the same bias voltage $V_{BIAS}$. Base resistors can be connected between the bases and collectors of Q2 and Q6 to compensate for the alpha of the transistors.

The bias voltage $V_{BIAS}$ is generated at bias node 20 by an adjunct cell including NPN transistors Q12–Q14 and current source 14. The adjunct cell is in most respects similar to that of FIG. 1 but with the addition of transistor Q14 which is arranged to supply all of the DC base currents thereby improving the bias accuracy. A capacitor C6 is coupled between node 20 and GND to make this a low impedance node. The overall power consumption of the circuit of FIG. 3 can be reduced by using a lower bias current $I_0$ through the adjunct cell transistors Q12 and Q13 and then reducing the emitter areas of Q12 and Q13 with respect to Q1, Q2, Q4, Q5, Q6 and Q7.

The circuit of FIG. 3 further includes an error amplifier which includes load resistors RL1 and RL2 and an operational amplifier 28. The load resistors RL1 and RL2 are connected between the positive power supply terminal VPOS and nodes 16 and 18, respectively. An on-chip filter capacitor C1 is connected in parallel with RL1 for extracting the mean value of the output current generated by the HF squaring cell. A bonding pad 26 is provided at node 16 to allow the addition of an external capacitor C2 in parallel with C1 in order to extend the averaging interval.

Operational amplifier 28 has its inverting and noninverting terminals connected to nodes 16 and 18, respectively, and its output terminal connected to the bases of transistors Q9 and Q10. Although shown as bipolar transistors, Q9 and Q10 would be very suitable for implementation as PMOS devices in a BiCMOS realization.

The input stage of op-amp 28 must be designed to accommodate a large common-mode voltage swing at its input terminals. The emitters of Q9 and Q10 are connected to VPOS through resistors R1 and R2, respectively. The collector of Q9 is connected to the base of Q7 at node 32 which forms the input terminal to the DC squaring cell. The collector of Q10 is connected to the collector and base of diode-connected NPN transistor Q11 which serves to equalize the collector voltages of Q9 and Q10 under quiescent conditions. The emitter of Q11 is connected to GND through resistor R3 which converts output current $I_{OUTPUT}$ to a voltage. A buffer amplifier 30 has an input terminal connected to the emitter of Q11 and an output terminal for providing the final output voltage $V_{OUT}$. A capacitor C3 is connected between the output terminal of the op-amp 28 and the collector of Q10 to provide high frequency stabilization of the (nonlinear) feedback system.

In operation, the circuit of FIG. 3 generates a voltage $V_{OUT}$ that is a quasi-DC signal 15 which is essentially proportional to the true RMS value of the input signal. In FIG. 3, the input signal is shown as being provided by a signal generator 24 which is coupled to the HF squaring cell through a DC-blocking capacitor C4 connected to input terminal 22. The HF and DC squaring cells operate in opposition to generate the first and second currents $I_1$ and $I_2$ in RL1 and RL2, respectively. A nulling circuit, which includes capacitor C1 (and C2 if present), the error amplifier, and transistor Q9, equalizes the currents $I_1$ and $I_2$ over an averaging period which is long compared to the signal period or that of the modulation components thereon.

The first current $I_1$ is low-pass filtered by capacitor Cl which shunts load resistor RL1. The currents $I_1$ and $I_2$ are converted into voltages by load resistors RL1 and RL2 at nodes 16 and 18, respectively. Op-amp 28 drives transistor Q9 which converts the voltage output from the op-amp to a feedback current $I_{FB}$ which drives the DC squaring cell, thereby closing a feedback loop through the DC squaring cell. The feedback loop nulls the imbalance caused by the output generated by the HF squaring cell.

Transistor Q10 replicates the current through Q9 (optionally with a change in scaling factor including R1 and R2) to provide the current $I_{OUTPUT}$ to R3. Resistor R3 converts the current $I_{OUTPUT}$ to a voltage which is buffered by buffer amplifier 30 to generate the output voltage $V_{OUT}$ having a ground-referenced value. For good accuracy, it is important to maintain the collectors of Q9 and Q10 at the same voltage, so transistor Q11 is included to replicate the base-emitter voltage across Q6 and Q7, and the value of R3 may chosen to replicate the impedance seen at the input to the HF squaring cell.

The arrangement of a DC squaring cell in a feedback path implements the implicit square-root function. Thus, the HF squaring cell provides the "square", the filter capacitor C1 provides the "mean", and the DC squaring cell in the feedback path provides the "root" of the "root-mean-square" (RMS) function. However, for signals below the low-pass filter frequency, the circuit provides the absolute-value function.

Since a squaring cells doubles the dynamic range of an input signal, the squaring cells, the load resistors, and the op-amp must be very well-balanced to maintain an accurate RMS-to-DC conversion for small inputs. An RMS-to-DC converter in accordance with the present invention is preferably embodied in a monolithic implementation in which this balance can be achieved through interdigitation and cross-quadding of the squaring cells and load resistors, as well as by attention to detail in numerous such ways in the error amplifier. Thus, the balance between the squaring cells should be achieved through the physical structure (layout) of the cells, as well as by careful design. The use of a common bias voltage $V_{BIAS}$ for both squaring cells contributes to the balance between the cells; in particular, the balance does not depend on the absolute-value of the bias current because the dual squaring cell structure inherently equalizes the zero-signal baseline current. However, the value of the bias current $I_0$ affects the input impedance of the cells, and this dictates the need for suitably accurate bias control.

Load resistors RL1 and RL2 are chosen to provide the largest possible voltage swing across these resistors and thus provide maximum sensitivity at low input levels. However, using high resistance load resistors limits the peak input signal range because, as the currents $I_1$ and $I_2$ increase, the voltage at the collectors of Q1 and Q4 decreases, and these transistors will saturate if the voltage drops too low. In a preferred embodiment, the load resistors are made non-linear as described below to improve the input signal range.

Although the circuit shown in FIG. 3 is configured in a measurement mode, it can also be reconfigured as a controller by disconnecting the collector of Q9 from node 32 and using the voltage $V_{OUT}$ as a control signal to control the gain of a variable gain device such as an RF power amplifier. The output signal from the power amplifier is then sampled with a directional coupler and used as the input signal to the HF squaring cell. The overall system can be arranged to regulate the true output power of the amplifier to a value determined by a set-point signal applied to the input of the DC squaring cell at node 32. (Another arrangement for providing both measurement or control modes of operation is described below with respect to FIG. 10.)

An advantage of the circuit of FIG. 3 is that it provides true RMS detection even at very high input frequencies and at low power supply currents. In FIG. 3, only the four transistors Q1–Q4 in the HF squaring cell must operate at RF frequencies. The first squared current $I_1$ is immediately filtered by C1, so the remainder of the circuit can operate at much lower frequencies. The loop bandwidth of the feedback path is determined by the filter time-constant RL1C1 (or RL1(C1+C2) if C2 is present) and the poles in the transfer function of the op-amp 28, largely determined by the transconductance (gm) of its input stage and the capacitor C3.

This structure is well suited to applications in demanding systems such as carrier division multiple access (CDMA) which entail complicated modulation envelopes with high crest factors imposed on a high-frequency carrier. From the perspective of power measurement, CDMA modulation appears very similar to noise of high crest factor, which requires the use of a filter with a long time constant to measure the true power of the full modulation, while the RMS-to-DC converter must have enough bandwidth to accurately respond to the carrier frequency. The HF squaring cell of FIG. 3 can be fast enough to respond to even a microwave carrier, while C1 can increased without limit by the connection of an external capacitor C2 to assure that the filter time constant is as long as necessary to measure the true power of any modulation envelope on a time-scale of milliseconds or even longer.

A key feature of the dual squaring cell configuration of the circuit of FIG. 3 is that the zero-signal baseline currents of the two squaring cells are highly balanced for all conditions of bias current, temperature and supply voltage. The use of dual squaring cells and the nulling process also results in some cancellation of the square-law conformance errors between the two cells, thereby reducing the effect of these errors for signals of high crest factor.

A further advantage of a squaring cell in accordance with the present invention is that, not only does it provide a good square-law approximation over a certain input range, but it still provides useful power-measurement capabilities even when the magnitude of the input signal exceeds the square-law range. Referring to FIG. 2, when the input signal is large, the output function of the squaring cell (shown as a solid line) no longer approximates a parabola (curved portion of the function), but instead begins to converge on the absolute-value function (shown as broken lines). However, even when the input signal is large enough to cause the squaring cells to operate as absolute-value cells, the circuit of FIG. 3 still operates as an excellent AC voltmeter. This is in contrast to squaring cells based on other techniques such as, for example, the multi-tanh triplet transconductance cells described in co-pending application Ser. No. 09/245,051 which have a more limited large-signal capacity.

A general problem with integrated-circuit RMS-to-DC converters operating at low currents, and thus low current densities, its that they may be too slow to operate at high RF frequencies. However, by implementing the circuit of FIG. 3 using "low inertia" transistors of small device geometries (such as those currently available with bipolar processing technologies that produce transistors having an $f_T$ of 25 GHz), good high frequency operation (i.e., upwards of 3 GHz) can be achieved even at low bias currents.

Another advantage of the squaring cells shown in FIGS. 1 and 3 is that they provide a well-defined input impedance that can also be adjusted by a simple adjustment of the bias current $I_0$. The incremental (small-signal) resistance $r_e$ of a BJT is given by $r_e=V_T/I_0$ where $V_T$ is the thermal voltage (≈26 mV at 300K) and $I_0$ is the quiescent or bias current. Thus, at a bias current of 260 μA, Q1 and Q2 each have an $r_e$ of 100 ohms which, operating effectively in parallel, gives the cell a 50-ohm input impedance. The bias currents through the squaring cells should be proportional to absolute temperature (PTAT) so that the input impedance remains constant with temperature. It should also be noted that the input to the HF squaring cell behaves more as a matching network than as a termination network, so it is not necessary to use additional resistors to define the input impedance.

For several reasons, it may be preferable to configure the circuit of FIG. 3 for some other impedance, for example 200 ohms rather than 50 ohms. First, a squaring cell in accordance with the present invention has a "$V_T$ scaling"; that is, it provides a good square-law approximation for input voltages that are roughly in the range of about $\pm 2V_T$. For this full scale input voltage range (about ±50 mV), a 200-ohm input impedance provides a power sensitivity (to a certain available power) that is four times greater than the sensitivity of a 50-ohm impedance. Second, a higher input impedance mandates lower bias currents, and thus, less power is dissipated in both squaring cells. Finally, it allows for the use of a 200-ohm directional coupler when the circuit is used to measure the power from an antenna driven by an RF power amplifier. It should also be noted that it is easy to use a matching network to couple a 200-ohm input to a 50-ohm source if necessary.

The upper end of the dynamic range of the circuit of FIG. 3 is determined largely by the departure from square-law behavior at high input signal levels. The lower end of the dynamic range is determined largely by the balance that can be achieved in the system, including the matching of the transistors in the squaring cells. Since the transconductance of these cells is very small near the vertical axis, small input voltages cause only tiny changes in their output. The error-amplifier system must be able to respond to the very small changes in the currents $I_1$ and $I_2$ if it is to accurately measure the input signal.

The square-law behavior discussed above with respect to Eqs. 1–5 and FIG. 2 is defined in terms of a pure current input. However, the HF squaring cell is driven in an impedance mode in conjunction with the input signal generator. The impedance signal generator and the input impedance of the circuit of FIG. 1 affect the square-law behavior as illustrated with reference to FIGS. 12–15.

Figure 12:
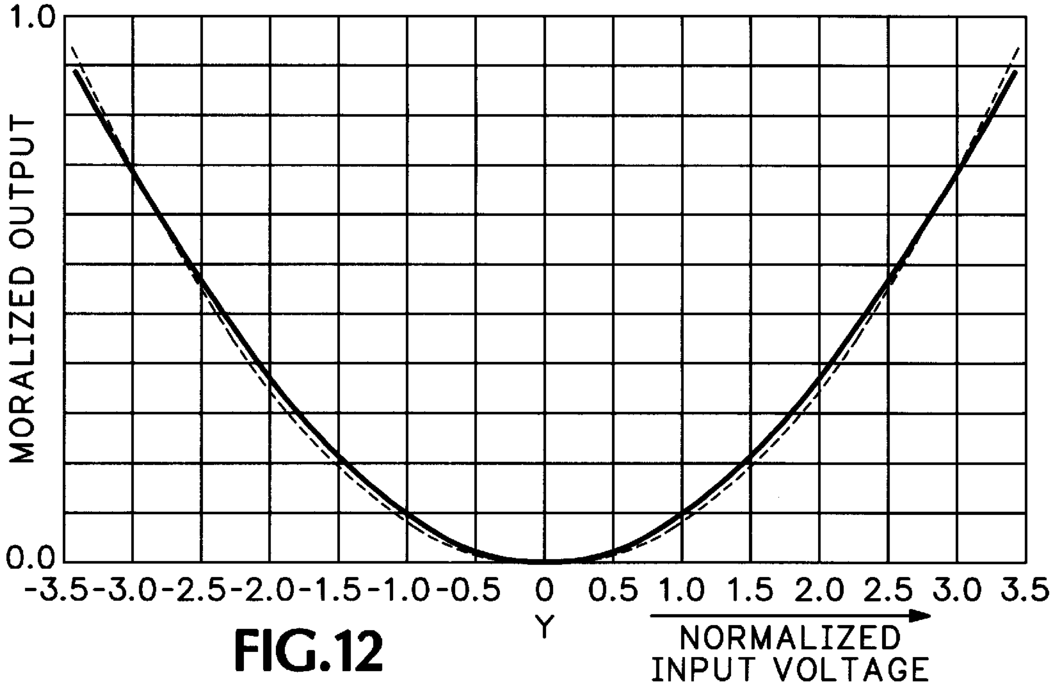
FIGS. 12–15 are graphs showing simulation results for the circuit of FIG. 1.

FIG. 12 shows a simulation result of the baseline-corrected and normalized output current (solid line) for the circuit of FIG. 1 compared to an ideal square-law function (broken line) using a voltage source coupled to the input terminal 22 through a resistor of 129 ohms. The bias current $I_0$ is 100 μA, and the voltage source generates a voltage $V_{GEN}$=Y(kT/q), where kT/q is the thermal voltage $V_T$ (≈26 mV at 300K). Thus, the horizontal axis is a normalized input voltage. The 129 ohm source impedance is the nominal input impedance of the squaring cell when $I_0$ is 100 μA.

Figure 13:
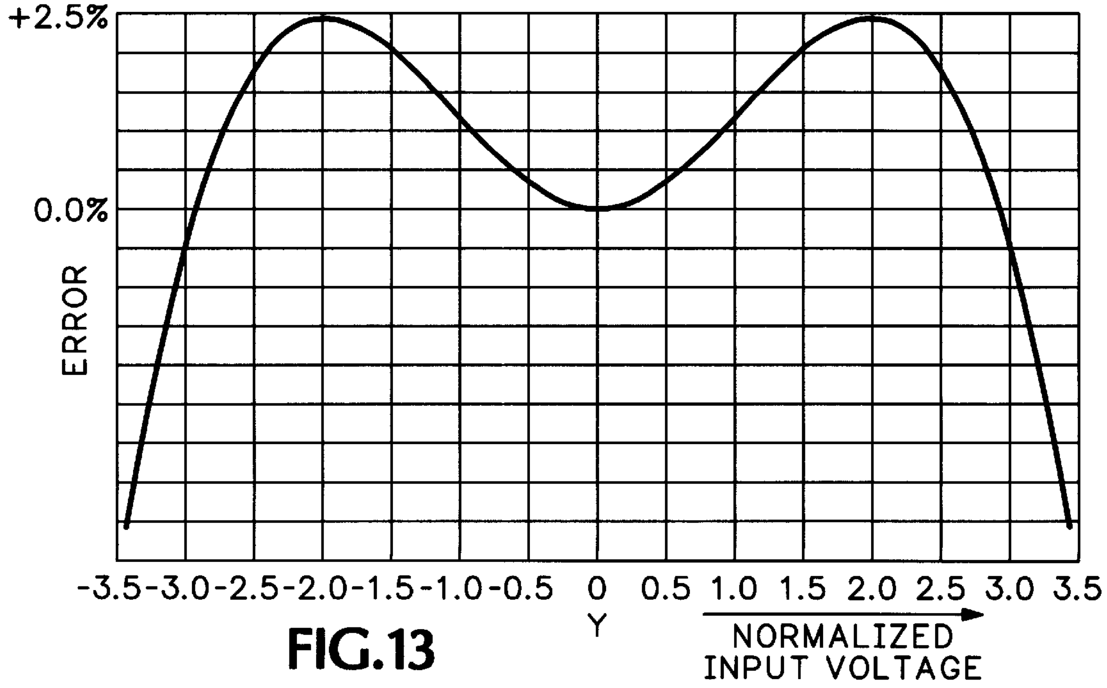

FIG. 13 shows the error between the actual output and the ideal square-law function, i.e., the difference between the solid and broken lines, in FIG. 12. The error obtained from this group of parameters ranges from 0 to about +2.5 percent as Y swings from −2.5 to +2.5.

Figure 14:
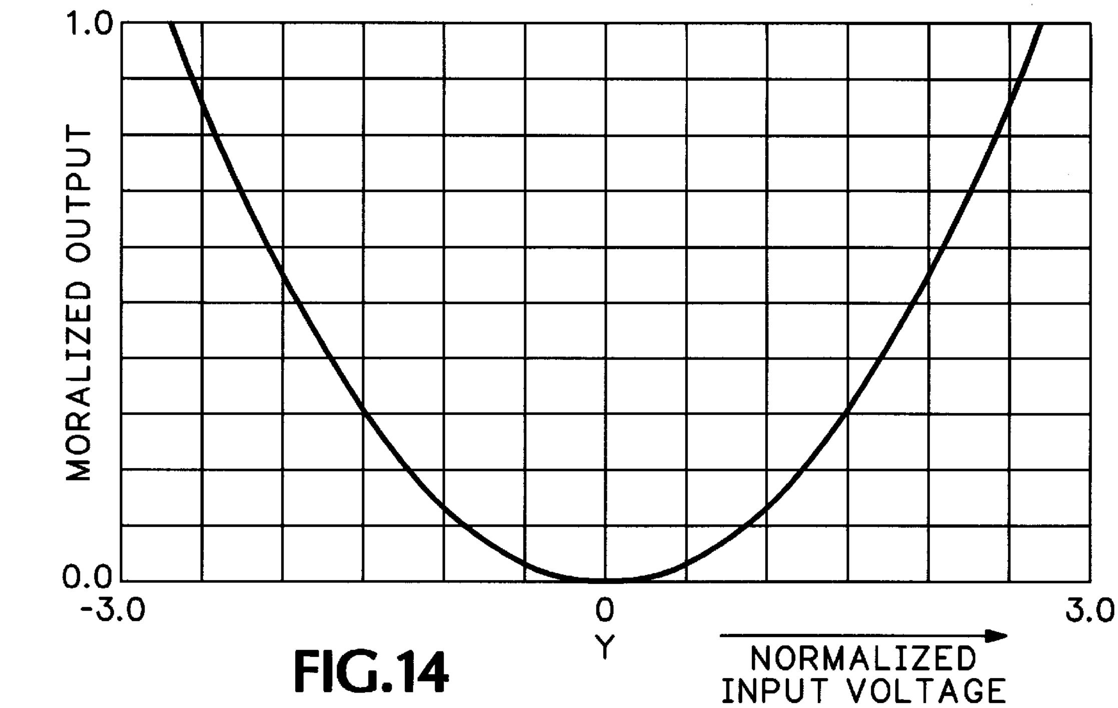
Figure 15:
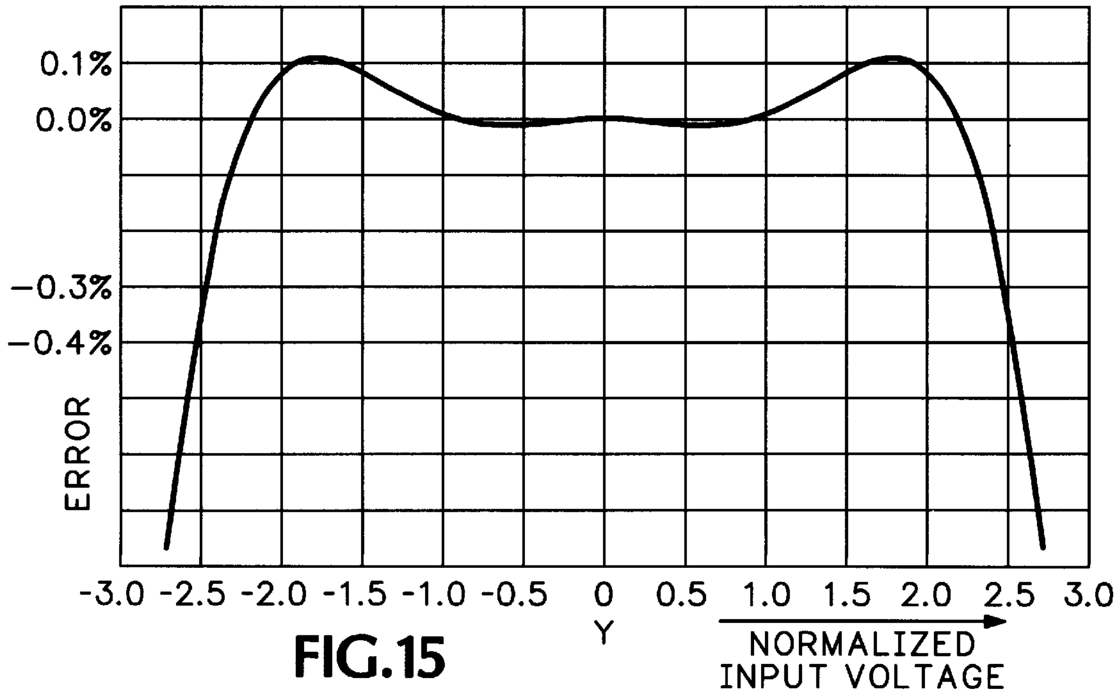

FIGS. 14 and 15 show the simulation results for an optimized arrangement utilizing a source resistance of 50 ohms and $I_0$=75 μA. In this case, the actual (solid line) and ideal (broken line) curves track closely. The error only ranges from −0.35 to about +0.1 percent as Y swings from −2.5 to +2.5.

Figure 4:
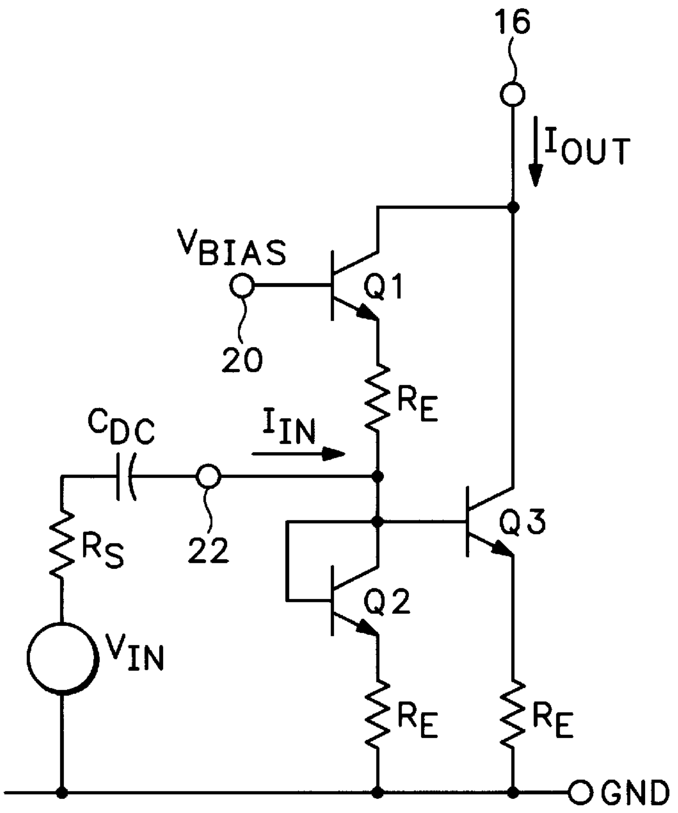
FIG. 4 is a schematic diagram of another embodiment of a squaring cell in accordance with the present invention.

One way to achieve a good square-law conformance in the circuit of FIGS. 1 and 3 is to limit the input current range and use large bias current $I_0$. However, a more robust solution can be obtained by using emitter resistors $R_E$ in series with Q1, Q2 and Q3 as shown in FIG. 4. These resistors contribute to the input impedance of the squaring cell, so to maintain a given input impedance, the bias current must be increased to reduce the $r_e$ of the transistors accordingly. The use of higher bias currents raises the $f_T$ of the transistors and thus improves the speed of the circuit.

Figure 16:
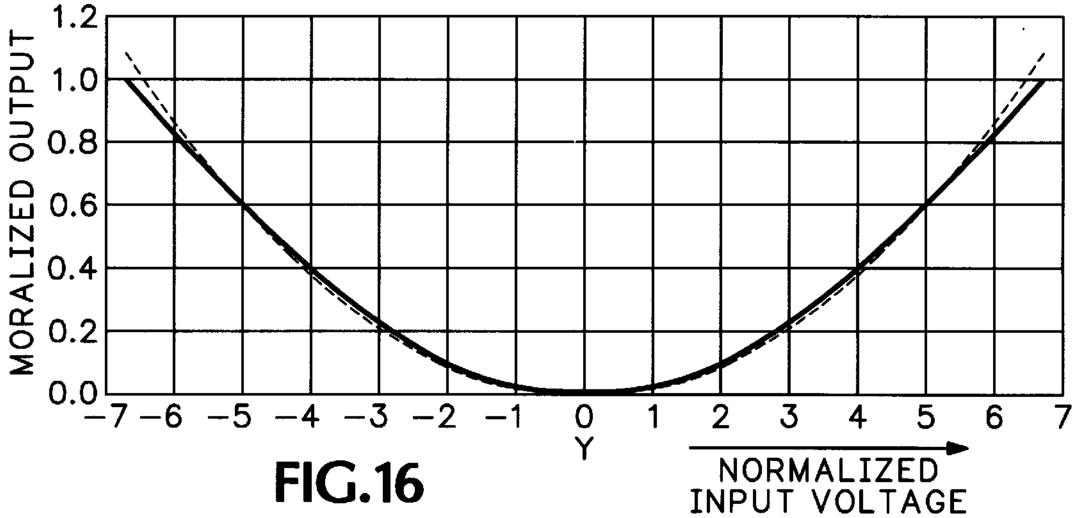
FIGS. 16–17 are graphs showing simulation results for the circuit of FIG. 4.
Figure 17:
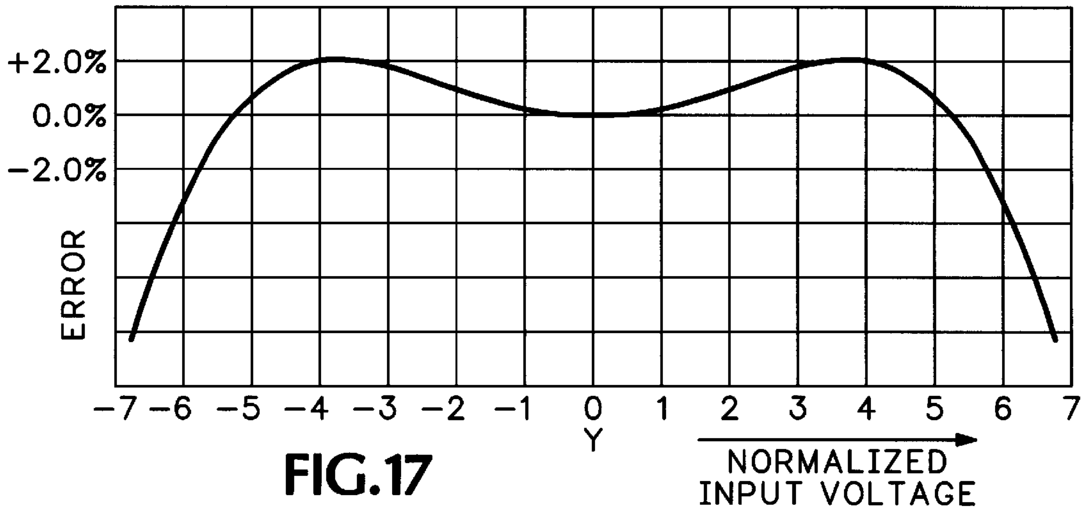

While the resulting circuit uses more power and the input tends to look more like a termination and less like a matching network, there are overall benefits to this modification. For example, the resistors increase the voltage input range of the squaring cells, and improve the overall square-law approximation as is illustrated in FIGS. 16 and 17 which show simulation results for the circuit of FIG. 4 with emitter resistors RE=140 ohms to provide a 200-ohm input impedance, and using $I_0$=100 μA and a source impedance of 200 ohms. As is apparent from FIGS. 16 and 17, the emitter resistors allow the circuit of FIG. 4 to operate accurately over a large range of input voltages. The error in this case ranges from about −2.5 to +2.5 percent as Y swings from −5.5 to +5.5.

Figure 5:
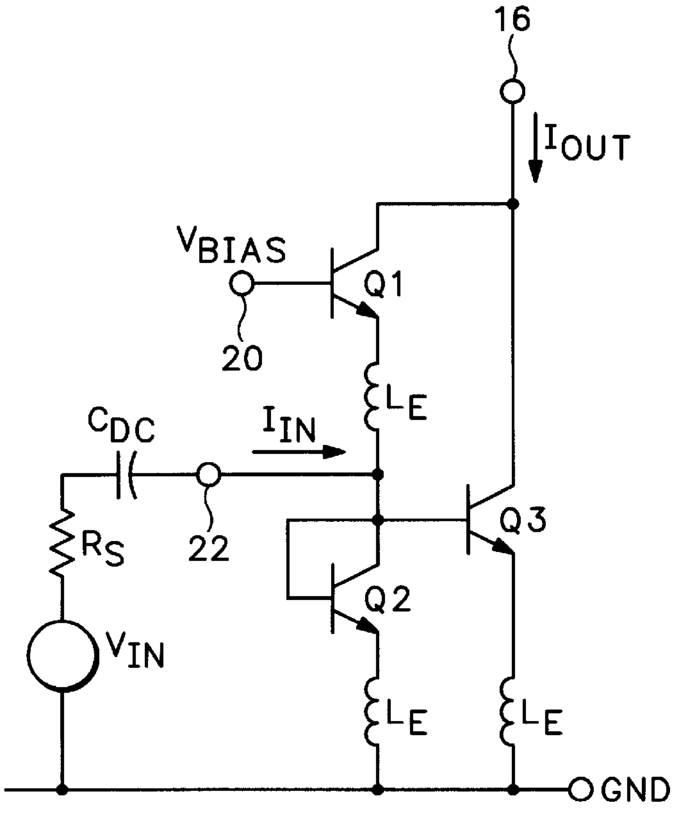
FIG. 5 is a schematic diagram of an embodiment of a squaring cell utilizing inductors in accordance with the present invention.

An alternative embodiment of a squaring cell in accordance with the present invention uses inductors as shown in FIG. 5 in place of the emitter resistors. In this case, the output characteristics of the squaring cell are frequency dependent.

Figure 6:
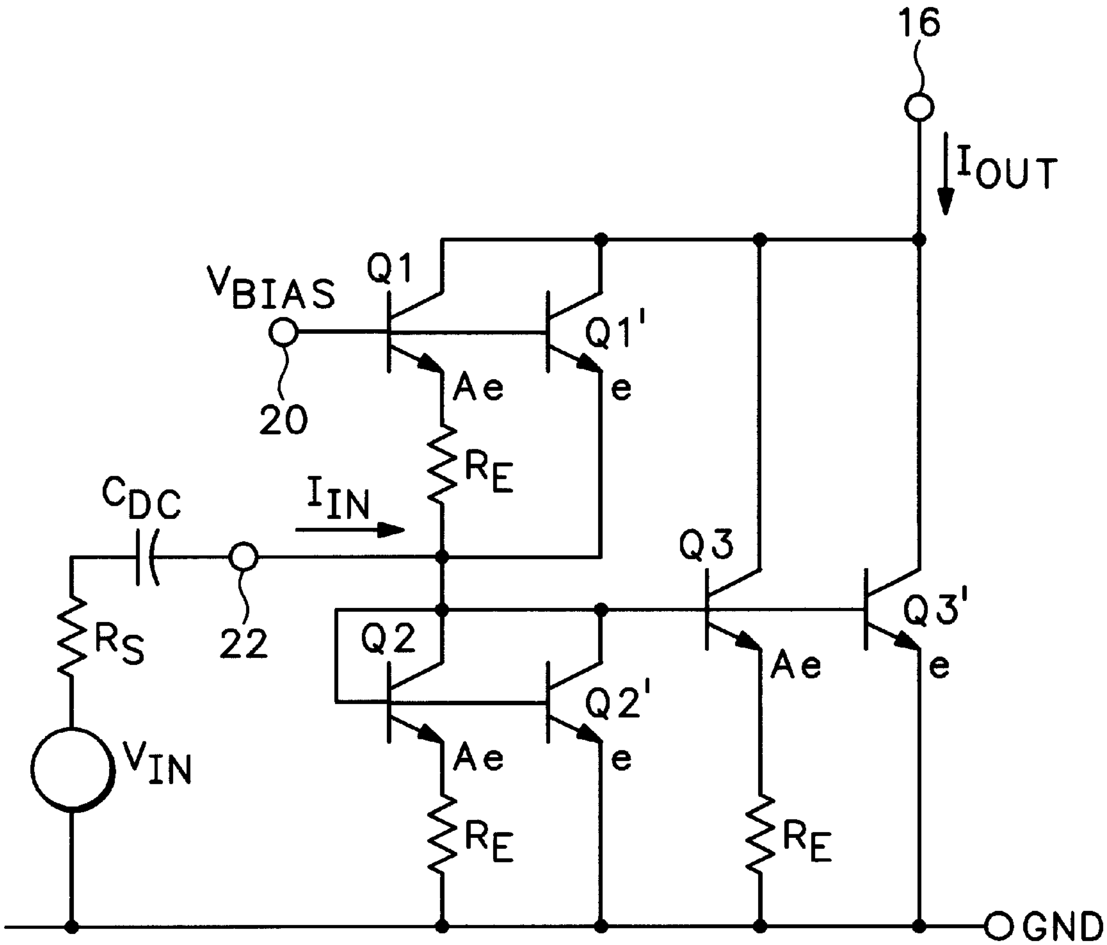
FIG. 6 is a schematic diagram of an embodiment of a squaring cell utilizing overlapping emitter-degenerated and fully translinear transistors in accordance with the present invention.

FIG. 6 shows another embodiment of a squaring cell in accordance with the present invention. The circuit of FIG. 6 includes a squaring cell essentially as shown in FIG. 4, but with an overlapping pure translinear (resistorless) squaring cell. That is, there is an additional transistor connected in parallel with each of the transistor-resistor pairs of FIG. 4. The transistors without emitter resistors have unit emitter areas "e", while the transistors with emitter resistors have emitter areas of A times "e". By vary the contribution from the emitter-degenerated and fully translinear portions of the circuit of FIG. 6, it is possible to take advantage of the relative advantage of both forms of the circuit. This configuration can provide improved performance, especially when driven from a pure voltage source, although it provides similar improvements when impedance driven. It provides a lower error over a larger range of input and provides much greater peak current output while preserving accuracy. Some optimum parameters for this circuit have been determined to be as follows: emitter area ratio A=62 and RE=32.5 ohms when using $I_0$=100 μA and a pure voltage drive.

Figure 8:
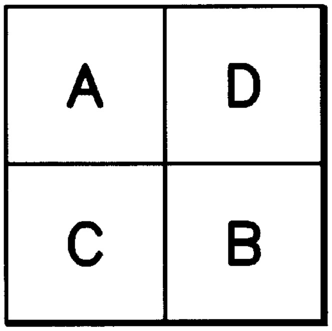
FIG. 8 shows the cross-quad layout of the squaring cells of FIG. 7.
Figure 7:
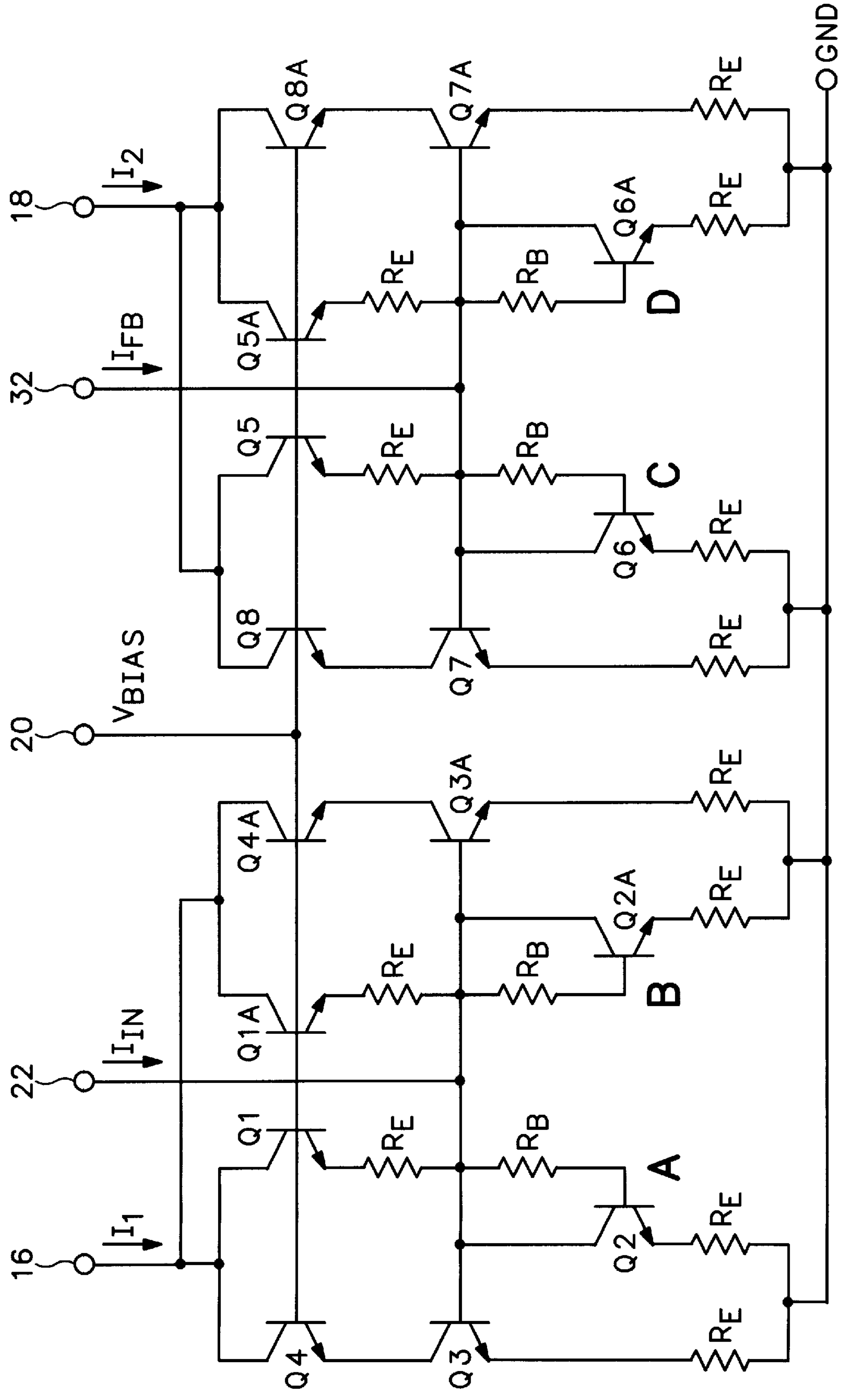
FIG. 7 is a schematic diagram of an embodiment of two cross-quadded squaring cells in accordance with the present invention.

FIG. 7 is a schematic diagram of an embodiment of a pair of balanced squaring cells in accordance with the present invention. Each squaring cell in FIG. 7 is implemented as a pair of parallel connected cells. Thus, squaring cells A and B operate in parallel as the HF squaring cell, and cells C and D operate in parallel as the DC squaring cell. The squaring cells are physically arranged on a substrate in a full cross-quad configuration as shown in FIG. 8 so that the effects of thermal and doping gradients as well as mechanical stress are cancelled as much as possible to provide good balance between the cells.

An emitter resistor $R_E$ is connected in series with the emitter of each of transistors Q1–Q3 and Q5–Q7 as well as the emitters of corresponding transistors Q1A–Q3A and Q5A–Q7A in the respective parallel squaring cells. A base resistor $R_B$ is connected in series with the base of each of transistors Q1–Q3, Q5–Q7, Q1A–Q3A, and Q5A–Q7A. When emitter resistors are included, the bias current must be adjusted to maintain the overall input impedance of the squaring cell at the desired value.

Some preferred design parameters for the circuit of FIG. 7 are as follows: $R_E$=160Ω; $R_B$=500Ω; and quiescent bias current through each transistor $I_0$=42 μAP (where P indicates PTAT). Using the equation $r_e=V_T/I_0$, it can be seen that the electronic resistance of each transistor is $r_e$=620, and therefore, the resistance total of each transistor and its associated emitter resistor $R_E$ is about 800Ω which results in an input impedance of about 200Ω. This bias current and emitter resistor values adjust the fit of the square-law approximation as discussed above to provide an RMS-to-DC converter that has a dynamic range of about 30 dB at 2 GHz operating from a 2.7V supply.

Figure 9:
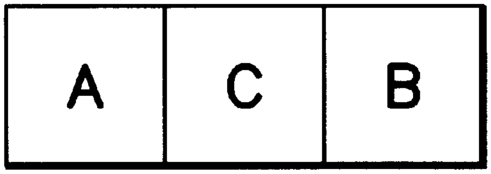
FIG. 9 shows the layout of two balanced squaring cells in accordance with the present invention in which one of the squaring cells is implemented as two parallel-connected cells that are arranged on opposite sides of the other squaring cell.

To reduce quiescent current consumption of the pair of squaring cells shown in FIG. 7, the DC squaring cell can be implemented as a single, rather than double, cell. In this case, the parallel cell labeled "D" in FIG. 7 is eliminated, and the remaining cells A, B and C are laid out in a linear arrangement in which the HF cells A and B are positioned on opposite sides of the DC cell C as shown in FIG. 9. The resistance of RL2 must increased by a factor of two to compensate for the reduction of the output current $I_2$ which results from the use of a single DC squaring cell.

Although the embodiments of the present invention described herein are implemented with BJTs, FETs can also be used, and in such an implementation, the BJT terminology should be understood to refer to the corresponding FET terminology. For example, a grounded base transistor would refer to a grounded gate transistor, emitter resistors would refer to source resistors, $V_{BE}$ would refer to $V_{GS}$, and so forth.

Figure 10:
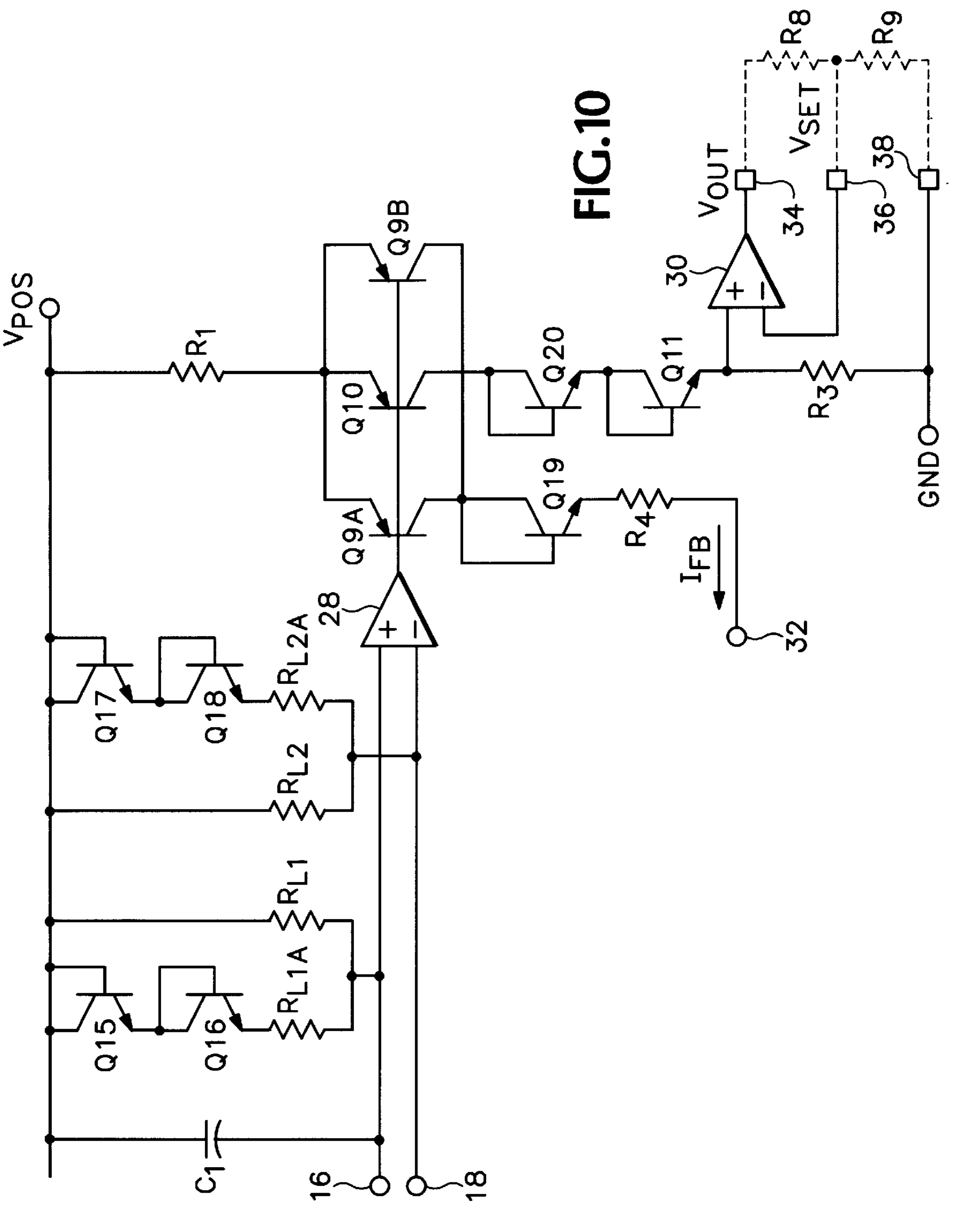
FIG. 10 is a schematic diagram of a practical embodiment of a nulling circuit and output buffer in accordance with the present invention.

FIG. 10 is a simplified schematic of a practical embodiment of a nulling circuit and output buffer in accordance with the present invention. The circuit of FIG. 10 includes a filter capacitor C1, load resistors RL1 and RL2 and op-amp 28 configured as in FIG. 3. However, the primary load resistor RL1 is connected in parallel with an additional current path formed by diode connected transistors Q15 and Q16 connected in series with a secondary load resistor RL1A. Likewise, the primary load resistor RL2 is connected in parallel with an additional current path formed by diode connected transistors Q17 and Q18 connected in series with a secondary load resistor RL2A. Resistor values in a practical embodiment are RL1,RL2=2.5 KΩ and RL1A,RL2A=1.25 KΩ. Although the circuit of FIG. 10 is shown with two diodes connected in series with each of load resistors RL1A,RL2A, a different number may be used.

The load resistors and series connected diodes of FIG. 10 taken together form a nonlinear loading system which extends the dynamic range of the overall system by preventing the transistors in the squaring cells from saturating. When the input signal to the system is small, the currents $I_1$ and $I_2$ flow entirely through the relatively high-resistance primary load resistors, which results in a large voltage swing, thereby maintaining the sensitivity to low input signals. However, as the input signal becomes larger, the diodes conduct progressively, and the secondary load resistors prevent the voltage drop across the loading circuit from becoming too great, thereby preventing the transistors in the squaring cells from saturating.

Transistors Q9 and Q10 of FIG. 10 are connected to operate with a common $V_{BE}$. Transistor Q9 is implemented as two transistors Q9A and Q9B in parallel. The collector of Q9 is connected to the input of the DC squaring cell at node 32 through a diode-connected transistor Q19 in series with a 150Ω resistor R4. The collector of Q10 is connected to GND through two diode-connected transistors Q20 and Q11 in series with a 447Ω resistor R3. Resistor R3 converts the current $I_{OUT}$ to a voltage at the noninverting input terminal of an op-amp 30. The output voltage $V_{OUT}$ from the op-amp is made available to the user at pin 34. In this embodiment, the inverting input terminal of op-amp 30 is also made available to the user at pin 36.

In a measurement mode, $V_{OUT}$ is connected directly back to $V_{SET}$, or via a simple off-chip resistive attenuator R8 and R9 in order to raise the scale factor. In a controller mode, $V_{OUT}$ performs the control function, e.g., is used to control the gain of the driver to a power amplifier, and the set-point signal is applied to $V_{SET}$. The circuit of FIG. 10 can also be used to implement a simple RF comparator, in which case the input signal is applied to the HF squaring cell, and the threshold voltage is applied to $V_{SET}$. In this mode, $V_{OUT}$ switches quickly to one extreme or the other when the voltage across R3—the filtered mean of the square of $V_{IN}$ (that is, the RMS value of the input signal)—equals $V_{SET}$.

Transistor Q20 provides a voltage drop that corresponds to the voltage drop across Q19, and Q11 provides a voltage drop that corresponds to the $V_{BE}$ at the input to the HF squaring cell. Resistor R3 provides a resistance that corresponds to the resistor R4 and the input impedance of the HF squaring cell. Transistors Q11, Q19 and Q20 are arranged to maintain the collectors of Q9 and Q10 at equal voltages so as to improve the matching of the currents $I_{OUT}$ and $I_{FB}$. Transistors Q9 and Q10 should preferably have small current sources coupled to their collectors to prevent them from turning off completely for small input levels.

Figure 18:
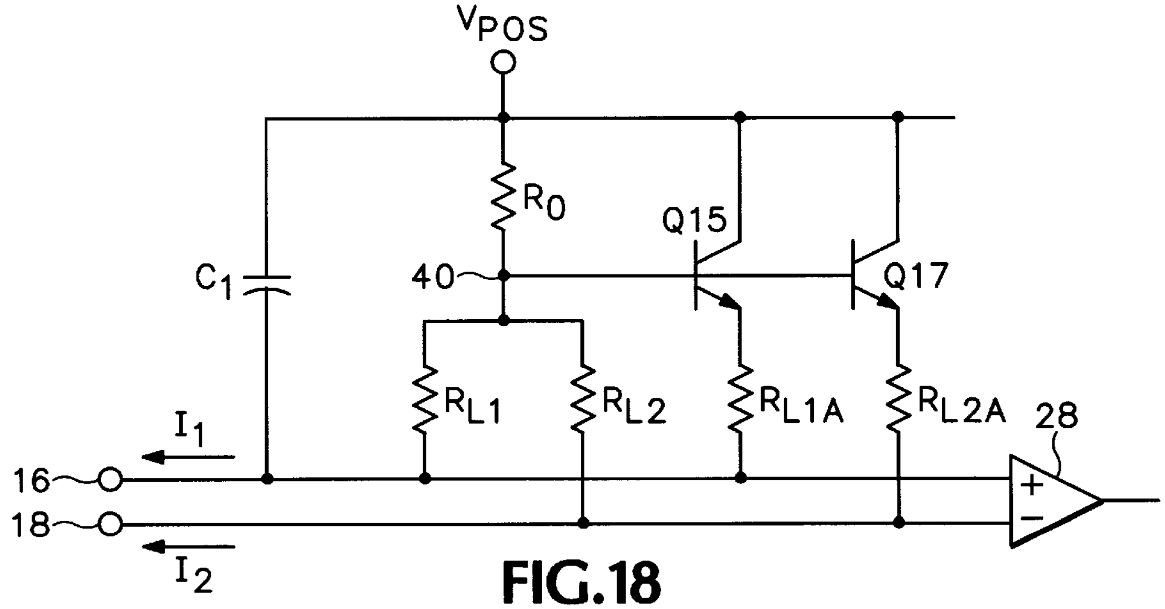
FIG. 18 is a schematic diagram of another embodiment of a nonlinear load in accordance with the present invention.

FIG. 18 is a schematic diagram of another embodiment of a nonlinear load in accordance with the present invention. The circuit of FIG. 18 includes load resistor RL1 connected between the output terminal of the HF squaring cell 16 and a node 40. Another load resistor RL2 connected between the output terminal of the DC squaring cell 18 and node 40. Node 40 is connected to VPOS through a resistor $R_0$. Transistors Q15 and Q17, rather than being diode connected, have their bases connected to node 40 and their collectors connected to VPOS. Secondary load resistor RL1A is connected between the emitter of Q15 and terminal 16, while secondary load resistor RL2A is connected between the emitter of Q17 and terminal 18. The circuit of FIG. 18 provides increased sensitivity at low current levels, while still allowing large maximum currents.

Figure 11:
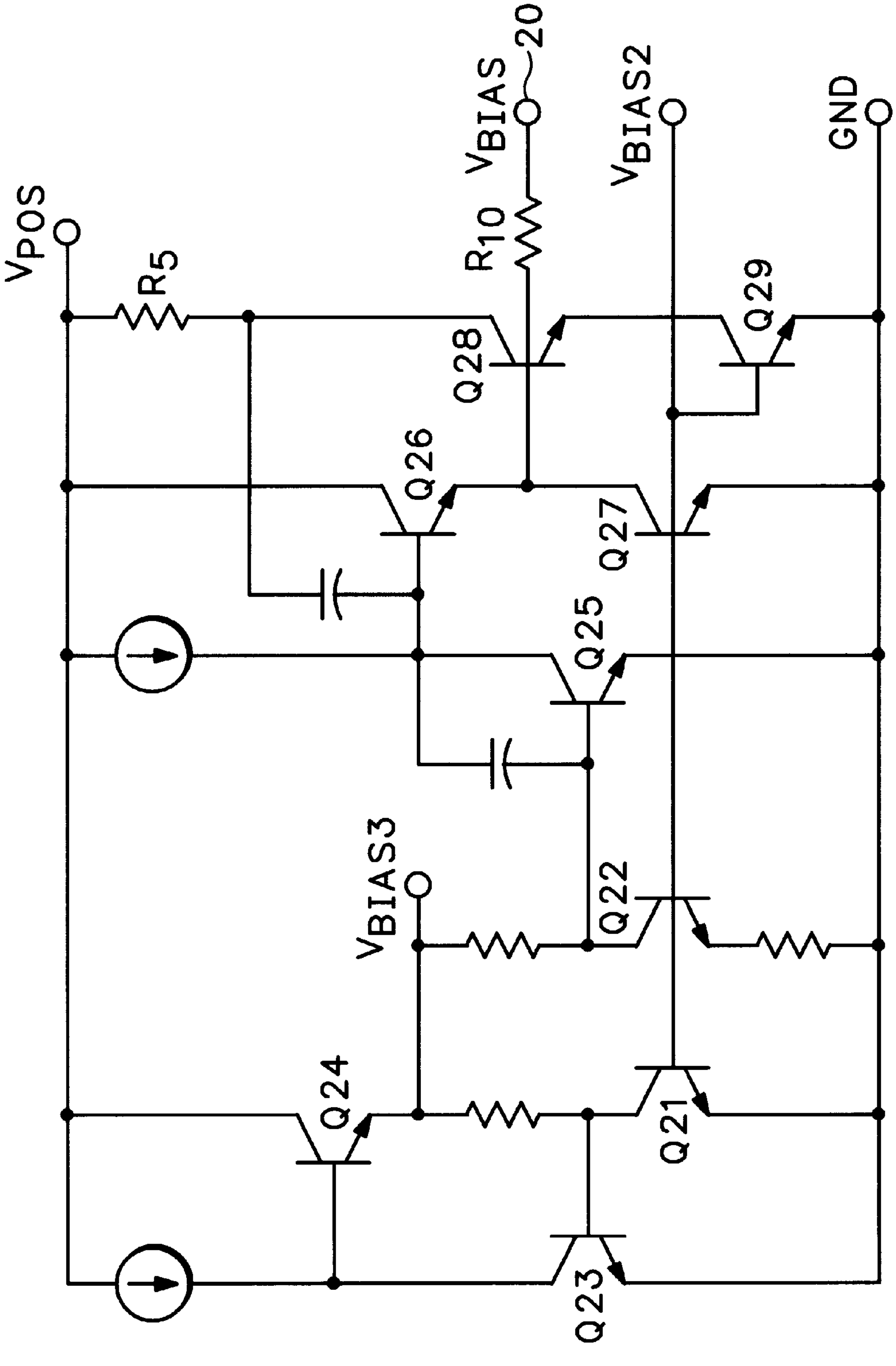
FIG. 11 is a schematic diagram of a practical embodiment of a bias voltage generator in accordance with the present invention.

FIG. 11 is a simplified schematic of a practical embodiment of a bias voltage generator in accordance with the present invention. The circuit of FIG. 11 generates a bias voltage $V_{BIAS}$ at node 20 that varies with temperature such that it causes the bias current through each transistor in the squaring cells to be proportional to absolute temperature. However, it does so in a different manner than the circuit shown in FIG. 3. The circuit of FIG. 3 generates the bias voltage $V_{BIAS}$ at node 20 by simply using a PTAT current $I_0$ flowing through Q12 and Q13 to generate the necessary voltage the base of Q12. In contrast, the circuit of FIG. 11 generates this voltage somewhat indirectly.

The circuit of FIG. 11 is based on a $\Delta V_{BE}$ cell such as that described with reference to FIG. 19 of U.S. patent application Ser. No. 08/918,728 filed Aug. 21, 1997 titled "RF Mixer With Inductive Degeneration" which is herein incorporated by reference. However, in the circuit of FIG. 11, the collector of emitter follower transistor Q26, rather than driving the $\Delta V_{BE}$ cell Q21 ,Q22 directly, is connected to the base of NPN transistor Q28. The collector of Q28 is connected to VPOS through a 7.6KΩ resistor R5, and its emitter is connected to the base of Q22 to drive the $\Delta V_{BE}$ cell. Another NPN transistor Q29 is connected as a diode between the emitter of Q28 and GND, and NPN current source transistor Q27 has its base connected to the base of Q22, its emitter connected to GND, and its collector connected to the emitter of Q26. The base of Q28 is connected to node 20 through a 234Ω resistor R10.

In operation, Q28 forms a nonlinear voltage divider with Q29. The PTAT bias voltage $V_{BIAS}$, is generated at the emitter of Q26 which is held at $2V_{BE}$ above GND by Q28 and Q29. A second PTAT bias voltage $V_{BIAS2}$ is generated at the base of Q22 and used for biasing components in the output buffer 30. A third bias voltage $V_{BIAS3}$ is generated at the emitter of Q24 and used for biasing components in the error amplifier.

Resistor R10 has the effect of lowering the DC bias of the squaring cells as a function of the DC beta to peak the drive to Q3 so that the current mirror has very similar phase characteristics to Q2, thereby improving the robustness of the circuit.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. An RMS-to-DC converter comprising:

a first squaring cell for generating a first squared signal responsive to a first input signal;

a second squaring cell for generating a second squared signal responsive to a second input signal; and a nulling circuit coupled to the first and second squaring cells for generating an output signal responsive to the first and second squared signals;

wherein the first squaring cell includes:

an input terminal and an output terminal, a grounded base transistor coupled between the input and output terminals of the first squaring cell, and a current mirror coupled between the input and output terminals of the first squaring cell.

2. An RMS-to-DC converter according to claim 1 wherein the second squaring cell includes:

an input terminal and an output terminal, a grounded base transistor coupled between the input and output terminals of the second squaring cell, and a current mirror coupled between the input and output terminals of the second squaring cell.

3. An RMS-to-DC converter according to claim 2 wherein the nulling circuit includes:

a load circuit coupled to the first and second squaring cells;

a filter circuit coupled to the load circuit; and an amplifier coupled to the load circuit.

4. An RMS-to-DC converter according to claim 3 wherein the load circuit includes:

a first resistor coupled to the output terminal of the first squaring cell; and a second resistor coupled to the output terminal of the second squaring cell.

5. An RMS-to-DC converter according to claim 3 wherein the filter circuit includes a capacitor coupled to the output terminal of the first squaring cell.

6. An RMS-to-DC converter according to claim 3 wherein the amplifier has a first input terminal coupled to the output terminal of the first squaring cell, a second input terminal coupled to the output terminal of the second squaring cell, and an output terminal.

7. An RMS-to-DC converter according to claim 3 wherein the nulling circuit further includes a transistor coupled between the amplifier and the input terminal of the second squaring cell to provide a feedback signal thereto.

8. An RMS-to-DC converter according to claim 7 further including a second transistor coupled to the amplifier and the first transistor so as to replicate the feedback signal, thereby generating an output signal.

9. An RMS-to-DC converter according to claim 8 further including a diode-connected transistor and a resistor coupled between the second transistor and a power supply terminal, wherein the resistor has a resistance that corresponds to the input resistance of the first squaring cell.

10. An RMS-to-DC converter according to claim 3 wherein the load circuit is nonlinear.

11. An RMS-to-DC converter according to claim 10 wherein the load circuit includes:

a first resistor coupled between the output terminal of the first squaring cell and a power supply terminal;

a second resistor coupled between the output terminal of the second squaring cell and the power supply terminal;

a first diode and a third resistor coupled in series between the output terminal of the first squaring cell and the power supply terminal; and a second diode and a fourth resistor coupled in series between the output terminal of the second squaring cell and the power supply terminal.

12. An RMS-to-DC converter according to claim 2 wherein a bias current is established in the grounded base transistor and the current mirror transistor in each of the squaring cells when the input signal is zero.

13. An RMS-to-DC converter according to claim 2 wherein the first and second squaring cells are coupled together to balance the cells.

14. An RMS-to-DC converter according to claim 13 further including:

a third squaring cell coupled in parallel with the first squaring cell; and a fourth squaring cell coupled in parallel with the second squaring cell;

wherein the first and third squaring cell are fabricated in a cross-quad arrangement with the second and fourth squaring cells.

15. An RMS-to-DC converter according to claim 13 wherein the bases of the grounded base transistors in the first and second squaring cells are coupled together to receive a bias signal.

16. An RMS-to-DC converter according to claim 2 wherein each of the squaring cells includes a cascode transistor coupled between the output terminal and the current mirror of the squaring cell.

17. An RMS-to-DC converter according to claim 2 wherein the base of the grounded base transistor in each of the squaring cells is maintained at a voltage of about $2V_{BE}$ from the voltage of a power supply terminal.

18. An RMS-to-DC converter according to claim 2 wherein:

the grounded base transistor of the first squaring cell has a collector coupled to the output terminal of the first squaring cell, a base coupled to a bias node for receiving a bias signal, and an emitter coupled to the input terminal of the first squaring cell;

the current mirror of the first squaring cell includes:

a diode-connected transistor having a collector coupled to the input terminal of the first squaring cell, a base coupled back to its collector, and an emitter coupled to a first power supply terminal, and a mirror transistor having a collector coupled to the output terminal of the first squaring cell, a base coupled to the base of the diode-connected transistor, and an emitter coupled to the first power supply terminal;

the grounded base transistor of the second squaring cell has a collector coupled to the output terminal of the second squaring cell, a base coupled to the bias node for receiving the bias signal, and an emitter coupled to the input terminal of the second squaring cell;

the current mirror of the second squaring cell includes:

a second diode-connected transistor having a collector coupled to the input terminal of the second squaring cell, a base coupled back to its collector, and an emitter coupled to the first power supply terminal, and a second mirror transistor having a collector coupled to the output terminal of the second squaring cell, a base coupled to the base of the second diode-connected transistor, and an emitter coupled to the first power supply terminal; and the nulling circuit includes:

a first load resistor coupled between the output terminal of the first squaring cell and a second power supply terminal, a second load resistor coupled between the output terminal of the second squaring cell and the second power supply terminal, a capacitor coupled between the output terminal of the first squaring cell and the second power supply terminal, an amplifier having a first input terminal coupled to the output terminal of the first squaring cell, a second input terminal coupled to the output terminal of the second squaring cell, and an output terminal, and a first transistor having an emitter coupled to a current source, a base coupled to the output terminal of the amplifier, and a collector coupled to the input terminal of the second squaring cell.

19. An RMS-to-DC converter according to claim 18 wherein each of the squaring cells includes a cascode transistor having a collector coupled to the output terminal of the squaring cell, a base coupled to the bias node, and an emitter coupled to the collector of the mirror transistor.

20. An RMS-to-DC converter according to claim 19 wherein each of the squaring cells includes:

a first resistor coupled in series with the emitter of the grounded base transistor;

a second resistor coupled in series with the emitter of the diode-connected transistor; and a third resistor coupled in series with the emitter of the mirror transistor.

21. An RMS-to-DC converter according to claim 20 further including:

a second transistor having an emitter coupled to the collector of the first transistor, a base coupled to the output terminal of the amplifier, and a collector;

a diode-connected transistor and a third resistor coupled in series between the collector of the second transistor and the first power supply terminal; and a buffer amplifier coupled to the third resistor.

22. An RMS-to-DC converter according to claim 21 further including:

a first diode and a fourth resistor coupled in series between the output terminal of the first squaring cell and the power supply terminal; and a second diode and a fifth resistor coupled in series between the output terminal of the second squaring cell and the power supply terminal.

23. A method for performing an RMS-to-DC conversion comprising:

establishing a bias current in a first squaring cell having an input terminal for receiving an input signal, an output terminal for transmitting an output signal, a grounded base transistor coupled between the input and output terminals, and a current mirror coupled between the input and output terminals;

establishing a bias current in second squaring cell having an input terminal for receiving an input signal, an output terminal for transmitting an output signal, a grounded base transistor coupled between the input and output terminals, and a current mirror coupled between the input and output terminals; and nulling the output signals from the first and second squaring cells.

24. A method according to claim 23 further including applying a signal to be measured to the input terminal of the first squaring cell, and wherein nulling the output signals includes:

filtering the output signal from the first squaring cell;

generating a feedback signal responsive to the difference of the output signals from the first and second squaring cells; and applying the feedback signal to the input terminal of the second squaring cell.

25. A method according to claim 24 further including replicating the feedback signal, thereby generating an RMS output signal.

26. A method according to claim 23 further including applying a set-point signal to the input terminal of the second squaring cell, and wherein nulling the output signals includes:

filtering the output signal from the first squaring cell;

generating a control signal responsive to the difference of the output signals from the first and second squaring cells;

controlling the gain of a variable-gain device responsive to the control signal, thereby generating controlled output signal;

coupling a sample of the controlled output signal to the input terminal of the first squaring cell.

27. A method according to claim 23 further including applying a bias signal to the bases of the grounded base transistor in each of the first and second squaring cells to establish the bias current in each of the first and second squaring cells.

28. A method according to claim 23 wherein the output signals from the first and second squaring cells are currents, and nulling the output signals includes:

filtering the output signal from the first squaring cell;

converting the output signals to voltages; and amplifying the difference between the voltages.

29. A method according to claim 23 further including limiting the input signal to the first squaring cell to a range in which the output function of the squaring cell approximates a square-law.

30. A method according to claim 23 further including coupling the first and second squaring cells together to balance the cells.

31. A method for operating a transistor cell comprising an input terminal for receiving an input signal, an output terminal for transmitting an output signal, a grounded base transistor coupled between the input and output terminals, and a current mirror coupled between the input and output terminals, wherein the current mirror includes a diode-connected transistor and a mirror transistor coupled to the diode-connected transistor, the method comprising:

biasing the transistor cell to establish a bias current in the grounded base transistor and the current mirror when the input signal is zero; and coupling first, second, and third resistors in series with the grounded base transistor, the diode-connected transistor and the mirror transistor, respectively.

32. A method according to claim 31 further including adjusting the bias current to compensate for the impedance of the resistors, thereby maintaining the input impedance of the transistor cell.

33. A method for operating a transistor cell comprising an input terminal for receiving an input signal, an output terminal for transmitting an output signal, a grounded base transistor coupled between the input and output terminals, and a current mirror coupled between the input and output terminals, wherein the current mirror includes a diode-connected transistor and a mirror transistor coupled to the diode-connected transistor, the method comprising:

biasing the transistor cell to establish a bias current in the grounded base transistor and the current mirror when the input signal is zero; and coupling first, second, and third inductors in series with the grounded base transistor, the diode-connected transistor and the mirror transistor, respectively.

34. A squaring cell comprising:

an input terminal;

an output terminal;

a grounded base transistor coupled between the input and output terminals;

a current mirror coupled between the input and output terminals wherein the current mirror includes a diode-connected transistor coupled between the input terminal and a power supply terminal, and a mirror transistor having a collector coupled to the output terminal, a base coupled to the input terminal, and an emitter coupled to the power supply terminal;

a bias signal generator coupled to the grounded base transistor to establish a bias current through the grounded base transistor and the current mirror; and first, second and third resistors coupled in series the with emitters of the grounded base transistor, the diode connected transistor, and the mirror transistor, respectively.

35. A squaring cell according to claim 34 further including first, second and third inductors coupled in series the with emitters of the grounded base transistor, the diode connected transistor, and the mirror transistor, respectively.

36. A squaring cell according to claim 34 further including:

a second grounded base transistor coupled between the input and output terminals;

a second diode-connected transistor coupled between the input terminal and the power supply terminal; and a second mirror transistor having a collector coupled to the output terminal, a base coupled to the input terminal, and an emitter coupled to the power supply terminal.

37. A squaring cell comprising:

an input terminal;

an output terminal;

a grounded base transistor coupled between the input and output terminals, wherein the grounded base transistor has a collector coupled to the output terminal, a base for receiving the bias signal, and an emitter coupled to the input terminal;

a current mirror coupled between the input and output terminals, wherein the current mirror includes:

a diode-connected transistor having a collector and base coupled to the input terminal and an emitter coupled to a power supply terminal, and a mirror transistor having a collector coupled to the output terminal, a base coupled to the input terminal, and an emitter coupled to the power supply terminal;

a bias signal generator coupled to the grounded base transistor to establish a bias current through the grounded base transistor and the current mirror;

a first resistor coupled between the emitter of the grounded base transistor and the input terminal;

a second resistor coupled between the emitter of the diode-connected transistor and the power supply terminal; and a third resistor coupled between the emitter of the mirror transistor and the power supply terminal.

38. A squaring cell according to claim 37 wherein the first, second and third resistors have a resistance of about 160 ohms.

39. A squaring cell according to claim 38 wherein the bias current through each transistor is about 85 $\mu$A.

40. A squaring cell comprising:

an input terminal;

an output terminal;

a grounded base transistor coupled between the input and output terminals;

a current mirror coupled between the input and output terminals;

a bias signal generator coupled to the grounded base transistor to establish a bias current through the grounded base transistor and the current mirror;

wherein the bias signal generator includes:

a $\Delta V_{BE}$ cell having a common terminal and a base terminal, wherein the common terminal is coupled to a power supply terminal;

a diode-connected transistor coupled between the base terminal of the $\Delta V_{BE}$ cell and the power supply terminal;

a divider transistor having an emitter coupled to the base terminal of the $\Delta V_{BE}$ cell and a base for generating the bias signal; and an emitter follower transistor having an emitter coupled to the base of the divider transistor for driving the base terminal of the $\Delta V_{BE}$ cell through a nonlinear voltage divider formed by the divider transistor and the diode-connected transistor.

41. A squaring cell according to claim 40 further including a resistor coupled between the base of the divider transistor and the base of the grounded base transistor.

42. A squaring cell comprising:

an input terminal;

an output terminal;

a grounded base transistor coupled between the input and output terminals, wherein the grounded base transistor has a collector coupled to the output terminal, a base for receiving the bias signal, and an emitter coupled to the input terminal;

a current mirror coupled between the input and output terminals, wherein the current mirror includes:

a diode-connected transistor having a collector and base coupled to the input terminal and an emitter coupled to a power supply terminal, and a mirror transistor having a collector coupled to the output terminal, a base coupled to the input terminal, and an emitter coupled to the power supply terminal; and a bias signal generator coupled to the grounded base transistor to establish a bias current through the grounded base transistor and the current mirror;

wherein the bias signal generator includes:

a $\Delta V_{BE}$ cell including:

a first transistor having an emitter coupled to the power supply terminal, a collector coupled to receive a first bias current, and a base, and a second transistor having an emitter coupled to the power supply terminal through a first resistor, a collector coupled to receive a second bias current, and a base coupled to the base of the first transistor;

a third transistor having an emitter coupled to the power supply terminal, a collector coupled to receive a third bias current, and a base coupled to the collector of the second transistor;

a fourth transistor having a collector coupled to receive a fourth bias current, a base coupled to the collector of the third transistor, and an emitter;

a fifth transistor having a collector coupled to a second power supply terminal, a base coupled to the emitter of the fourth transistor and the base of the grounded base transistor, and an emitter; and a sixth transistor having a collector coupled to the emitter of the fifth transistor, an emitter coupled to the power supply terminal, and a base coupled back to its collector in a diode connection.

43. A squaring cell according to claim 42 wherein the bias signal generator further includes a seventh transistor having an emitter coupled to the power supply terminal, a collector coupled to the emitter of the fourth transistor, and a base coupled to the base of the second transistor.

44. A squaring cell according to claim 42 further including a resistor coupled between the bases of the fifth transistor and the grounded base transistor.

45. An RMS-to-DC converter comprising:

a first squaring cell for generating a first squared signal responsive to a first input signal;

a second squaring cell for generating a second squared signal responsive to a second input signal; and a nulling circuit coupled to the first and second squaring cells for generating an output signal responsive to the first and second squared signals;

wherein the nulling circuit includes a nonlinear load coupled to the first and second squaring cells.

46. An RMS-to-DC converter according to claim 45 wherein the nonlinear load includes:

a first resistor coupled between the first squaring cell and a node;

a second resistor coupled between the second squaring cell and the node;

a first diode and a third resistor coupled in series between the first squaring cell and the node; and a second diode and a fourth resistor coupled in series between the second squaring cell and the node.

* * * * *